United States Patent
Hayashi et al.

(10) Patent No.: US 12,036,711 B2
(45) Date of Patent: Jul. 16, 2024

(54) PLASTICIZATION DEVICE, INJECTION MOLDING APPARATUS, AND THREE-DIMENSIONAL MODELING APPARATUS

(71) Applicant: SEIKO EPSON CORPORATION, Tokyo (JP)

(72) Inventors: Riona Hayashi, Shiojiri (JP); Seiichiro Yamashita, Azumino (JP); Kenta Anegawa, Matsumoto (JP); Megumi Enari, Shiojiri (JP); Masashi Fuchii, Minowa-Machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/181,134

(22) Filed: Feb. 22, 2021

(65) Prior Publication Data
US 2021/0260800 A1 Aug. 26, 2021

(30) Foreign Application Priority Data
Feb. 25, 2020 (JP) .................. 2020-028976

(51) Int. Cl.
*B29C 45/46* (2006.01)
*B29C 64/314* (2017.01)
(Continued)

(52) U.S. Cl.
CPC ............ *B29C 45/46* (2013.01); *B29C 64/314* (2017.08); *B33Y 30/00* (2014.12); *B33Y 40/00* (2014.12)

(58) Field of Classification Search
CPC ... B29C 64/209; B29C 64/314; B29C 64/295; B29C 45/46; B29C 45/464;
(Continued)

(56) References Cited

U.S. PATENT DOCUMENTS

| 3,577,841 A | * | 5/1971 | Ledoux | ................... | B29C 48/47 |
| | | | | | 264/211.1 |
| 3,584,342 A | * | 6/1971 | Neuville | ................. | B30B 11/22 |
| | | | | | 264/211.1 |

(Continued)

FOREIGN PATENT DOCUMENTS

| JP | 11141786 A | * | 5/1999 | ........... | B29C 65/342 |
| JP | H11-141786 A | | 5/1999 | | |

(Continued)

OTHER PUBLICATIONS

Minakami, JP-2019018491-A Translation, Feb. 2019, Clarivate Analytics, Full Document (Year: 2019).*

*Primary Examiner* — Xiao S Zhao
*Assistant Examiner* — Margaret B Hayes
(74) *Attorney, Agent, or Firm* — WORKMAN NYDEGGER

(57) ABSTRACT

A plasticization device that plasticizes a material, includes: a drive motor; a rotor that is to be rotated by the drive motor and has a groove-forming surface in which a curved projection strip portion is formed from a peripheral edge of a circular central portion toward an outer periphery of the rotor; a barrel that faces the groove-forming surface and includes a communication hole at a position facing the central portion of the groove-forming surface; and a heating unit that heats the material supplied between the rotor and the barrel, the rotor includes a protrusion protruding from the central portion toward the communication hole, and $$0.28 \leq S2/S1 \leq 1.03 \tag{1},$$

wherein S1 is an area of the central portion and S2 is a maximum area of a cross section of the protrusion along the groove-forming surface.

14 Claims, 9 Drawing Sheets

(51) Int. Cl.
*B33Y 30/00* (2015.01)
*B33Y 40/00* (2020.01)

(58) Field of Classification Search
CPC .............. B29C 48/144; B29C 48/2513; B29C 48/2522; B29C 48/2552; B29C 48/36; B29C 48/361; B29C 48/375; B29C 48/47; B29C 48/56; B29C 48/57; B29C 45/47; B29C 45/57; B29C 45/6914; B29C 45/2511; B29C 45/2513; B29C 45/2564; B29C 45/375; B29C 45/38; B29C 45/54; B29C 45/60; B29C 45/03; B29C 64/20; B33Y 30/00

See application file for complete search history.

(56) References Cited

U.S. PATENT DOCUMENTS

| | | | | |
|---|---|---|---|---|
| 3,841,814 | A * | 10/1974 | Eckhardt | B29C 45/464 366/279 |
| 3,846,059 | A * | 11/1974 | Wagner | B29C 48/47 425/207 |
| 3,861,843 | A * | 1/1975 | Keuchel | D01D 5/22 425/198 |
| 4,400,236 | A * | 8/1983 | Hanamura | C08F 6/00 159/DIG. 10 |
| 4,455,482 | A * | 6/1984 | Grandclement | B29D 23/005 219/535 |
| 6,146,575 | A | 11/2000 | Huston | |
| 6,533,570 | B2 * | 3/2003 | Meyer | B29C 48/09 425/467 |
| 7,820,039 | B2 * | 10/2010 | Schulz | B29C 48/397 210/402 |
| 2008/0213419 | A1 | 9/2008 | Skubic et al. | |
| 2015/0051339 | A1 | 2/2015 | Brunner et al. | |
| 2017/0210069 | A1 * | 7/2017 | Stubenruss | B29C 64/118 |
| 2019/0358903 | A1 | 11/2019 | Watanabe et al. | |
| 2020/0023562 | A1 | 1/2020 | Anegawa et al. | |
| 2020/0031037 | A1 | 1/2020 | Hideshima | |
| 2020/0061914 | A1 | 2/2020 | Onishi | |
| 2020/0101672 | A1 | 4/2020 | Watanabe et al. | |
| 2020/0338824 | A1 | 10/2020 | Cardon et al. | |

FOREIGN PATENT DOCUMENTS

| | | | |
|---|---|---|---|
| JP | 2009-137260 A | | 6/2009 |
| JP | 2009137260 A | * | 6/2009 |
| JP | 2009-269183 A | | 11/2009 |
| JP | 2010-241016 A | | 10/2010 |
| JP | 2012-131115 A | | 7/2012 |
| JP | 2019-202458 A | | 5/2018 |
| JP | 2019-018491 | | 2/2019 |
| JP | 2019-018491 A | | 2/2019 |
| JP | 2019-206160 A | | 12/2019 |
| JP | 2020-011488 A | | 1/2020 |
| JP | 2020-015219 A | | 1/2020 |
| JP | 2020-029019 A | | 2/2020 |
| JP | 2020-049791 A | | 4/2020 |
| WO | WO2007/119533 A | | 10/2007 |

* cited by examiner

| SAMPLE | AREA RATIO S2/S1 | HEIGHT H (MM) | CONSTRICTION | SHAPE |
|---|---|---|---|---|
| sp1 | 0.29 | 4 | ABSENCE |  |
| sp2 | 0.22 | 4 | PRESENCE |  |
| sp3 | 0.28 | 3 | ABSENCE |  |
| sp4 | 0.28 | 5 | PRESENCE |  |
| sp5 | 0.29 | 5 | ABSENCE |  |
| sp6 | 0.43 | 4 | ABSENCE |  |
| sp7 | 0.66 | 4 | ABSENCE |  |
| sp8 | 0.81 | 4 | ABSENCE |  |
| sp9 | 0.92 | 5 | ABSENCE |  |
| sp10 | 1.03 | 4 | ABSENCE |  |
| sp11 | 0 | 0 | — | — |

# PLASTICIZATION DEVICE, INJECTION MOLDING APPARATUS, AND THREE-DIMENSIONAL MODELING APPARATUS

The present application is based on, and claims priority from JP Application Serial Number 2020-028976, filed Feb. 25, 2020, the disclosure of which is hereby incorporated by reference herein in its entirety.

BACKGROUND

1. Technical Field

The present disclosure relates to a plasticization device, an injection molding apparatus and a three-dimensional modeling apparatus.

2. Related Art

Regarding a plasticization device, for example, JP-A-2009-137260 describes a plasticization device including: a barrel provided with a communication hole, a rotor provided with a spiral groove defining a plasticizing and kneading passage for a resin on an end face in sliding contact with the barrel, and a resin retention-preventing part projecting to the communication hole of the barrel from a rotational central part of the end face of the rotor.

In the plasticization device of JP-A-2009-137260, the resin retention-preventing part prevents retention of the resin at a coupling portion between the plasticizing and kneading passage and the communication hole. However, a specific size of the resin retention-preventing part for effectively preventing the retention of the resin is not sufficiently studied.

SUMMARY

A first aspect of the present disclosure provides a plasticization device that plasticizes a material. The plasticization device includes: a drive motor; a rotor that is to be rotated by the drive motor and has a groove-forming surface in which a curved projection strip portion is formed from a peripheral edge of a circular central portion toward an outer periphery of the rotor; a barrel that faces the groove-forming surface and includes a communication hole at a position facing the central portion of the groove-forming surface; and a heating unit that heats the material supplied between the rotor and the barrel, the rotor includes a protrusion protruding from the central portion toward the communication hole, and $$0.28 \leq S2/S1 \leq 1.03 \quad (1)$$

wherein S1 is an area of the central portion and S2 is a maximum area of a cross section of the protrusion along the groove-forming surface.

A second aspect of the present disclosure provides an injection molding apparatus. The injection molding apparatus includes: the plasticization device according to the first aspect; and a nozzle that communicates with the communication hole and injects the plasticized material into a molding mold.

A third aspect of the present disclosure provides a three-dimensional modeling apparatus. The three-dimensional modeling apparatus includes: the plasticization device according to the first aspect; and a nozzle that communicates with the communication hole and discharges the plasticized material toward a stage.

DESCRIPTION OF EXEMPLARY EMBODIMENTS

A. First Embodiment

Figure 1:
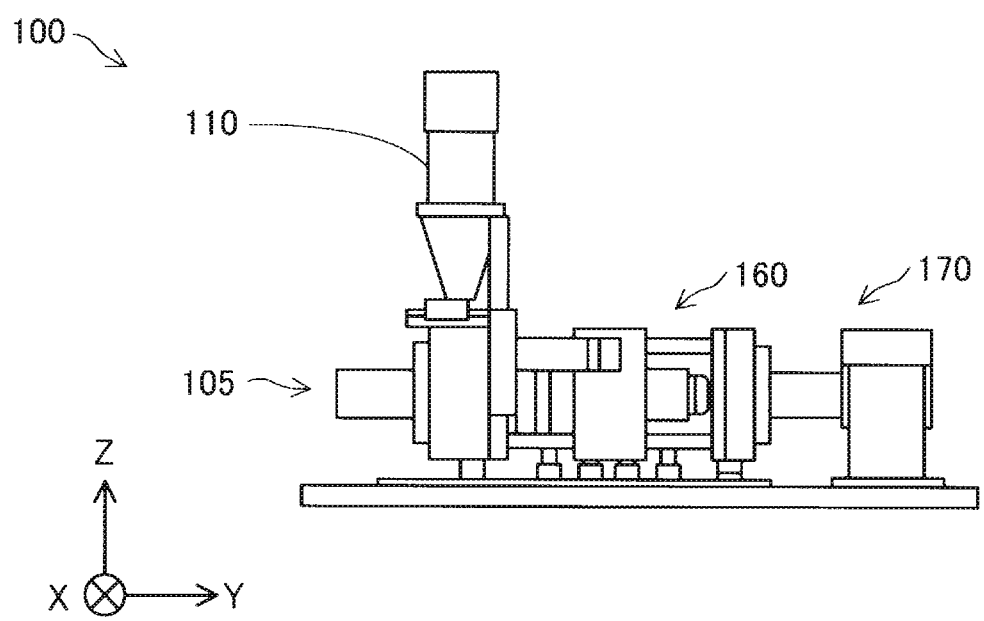
FIG. 1 is a diagram showing a schematic configuration of an injection molding apparatus according to a first embodiment.

FIG. 1 is a diagram showing a schematic configuration of an injection molding apparatus 100 according to the present embodiment. In FIG. 1, arrows along X, Y and Z directions orthogonal to one another are shown. The X, Y, and Z directions are directions along an X axis, a Y axis, and a Z axis that are three spatial axes orthogonal to one another, and include both one direction along the X axis, the Y axis, and the Z axis and an opposite direction. The X axis and the Y axis are axes along a horizontal plane, and the Z axis is an axis along a vertical line. In other figures, the arrows along the X, Y and Z directions are shown appropriately. The X, Y and Z directions in FIG. 1 and the X, Y and Z directions in other figures indicate the same directions.

The injection molding apparatus 100 includes an injection unit 105, a material supply unit 110, a mold unit 160, and a mold clamping device 170. The injection molding apparatus 100 plasticizes a material supplied from the material supply unit 110 to generate a plasticized material, and injects the plasticized material by the injection unit 105 into the mold unit 160 to mold a molded object.

Figure 2:
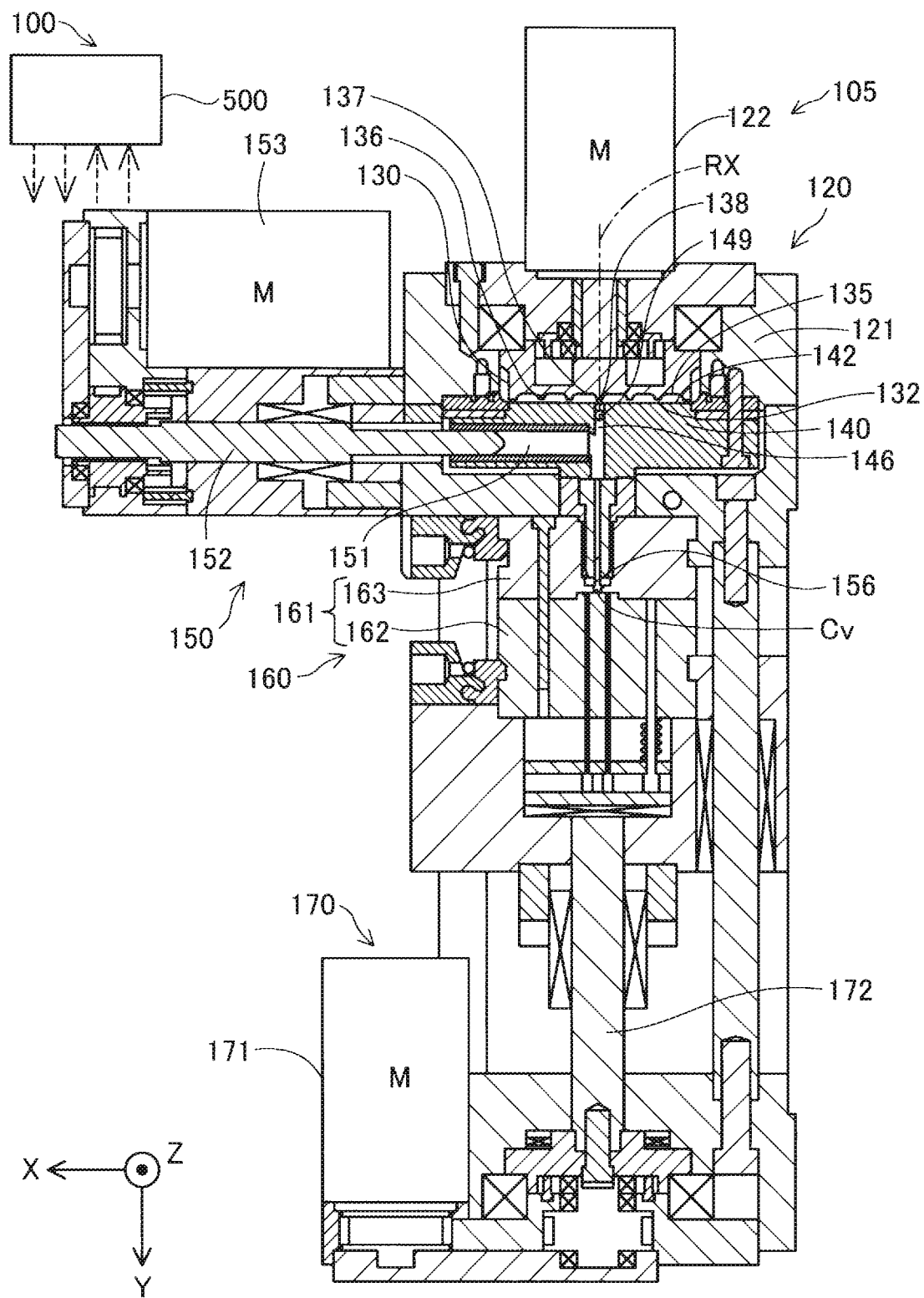
FIG. 2 is a cross-sectional view showing the schematic configuration of the injection molding apparatus according to the first embodiment.

FIG. 2 is a cross-sectional view showing a schematic configuration of the injection molding apparatus 100. FIG. 2 shows the injection unit 105, the mold unit 160, and the mold clamping device 170 of the injection molding apparatus 100. The injection unit 105 includes a plasticization device 120, an injection control unit 150, an injection nozzle 156, and a control unit 500.

The material supply unit 110 shown in FIG. 1 communicates with the plasticization device 120 shown in FIG. 2. The material supply unit 110 supplies the material to the plasticization device 120. In the present embodiment, the material supply unit 110 is implemented by a hopper. A material in a state of pellets, powder, or the like is accommodated in the material supply unit 110. In the present embodiment, as the material, an ABS resin formed in a pellet shape is stored in the material supply unit 110.

Figure 4:
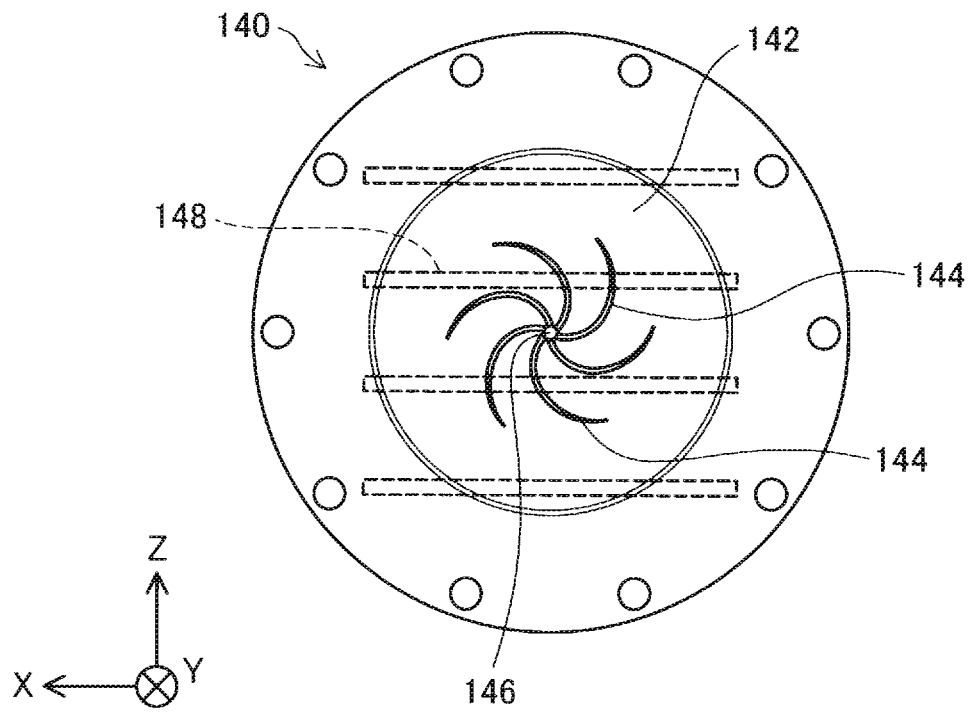
FIG. 4 is an explanatory view showing a configuration of a barrel on a facing surface side.

The plasticization device 120 includes a rotor case 121, a drive motor 122, a rotor 130, a barrel 140, a heating unit 148, and a check valve 149. The heating unit 148 is not shown in FIG. 2, and is shown in FIG. 4, which will be described later. The plasticization device 120 plasticizes at least a part of the material supplied from the material supply unit 110, and generates a plasticized material paste having fluidity, and then guides the plasticized material to the injection control unit 150. A term "plasticization" means that a material having thermoplasticity is softened by being heated to a temperature equal to or higher than a glass transition point to exhibit the fluidity. A term "melt" means not only that the material having thermoplasticity is converted into a liquid by being heated to a temperature equal to or higher than a melting point, but also the material having thermoplasticity is plasticized. The rotor 130 of the present embodiment may be referred to as a "scroll" or a "flat screw", or may be simply referred to as a "screw".

The rotor 130 has a substantially columnar shape whose height in a direction along a central axis RX thereof is smaller than a diameter. The rotor 130 is accommodated in a space surrounded by the rotor case 121 and the barrel 140. The rotor 130 includes a groove-forming surface 132 in which curved projection strip portions 136 are provided on a face facing the barrel 140. Specifically, the groove-forming surface 132 faces a facing surface 142 of the barrel 140. The curved projection strip portions 136 are formed on the groove-forming surface 132. The central axis RX may be referred to as a rotation axis of the rotor 130. In FIG. 2, the central axis RX is indicated by a dotted and dashed line.

The drive motor 122 is coupled to an opposite-side face of the rotor 130 from the groove-forming surface 132. The rotor 130 rotates around the central axis RX based on torque generated by the drive motor 122. The drive motor 122 is driven under a control of the control unit 500. The drive motor 122 may not be directly coupled to the rotor 130. For example, the rotor 130 and the drive motor 122 may be coupled via a speed reducer. In this case, for example, the drive motor 122 may be coupled to a planetary gear of the speed reducer including a planetary gear mechanism, and the rotor 130 may be coupled to a sun gear.

Figure 3:
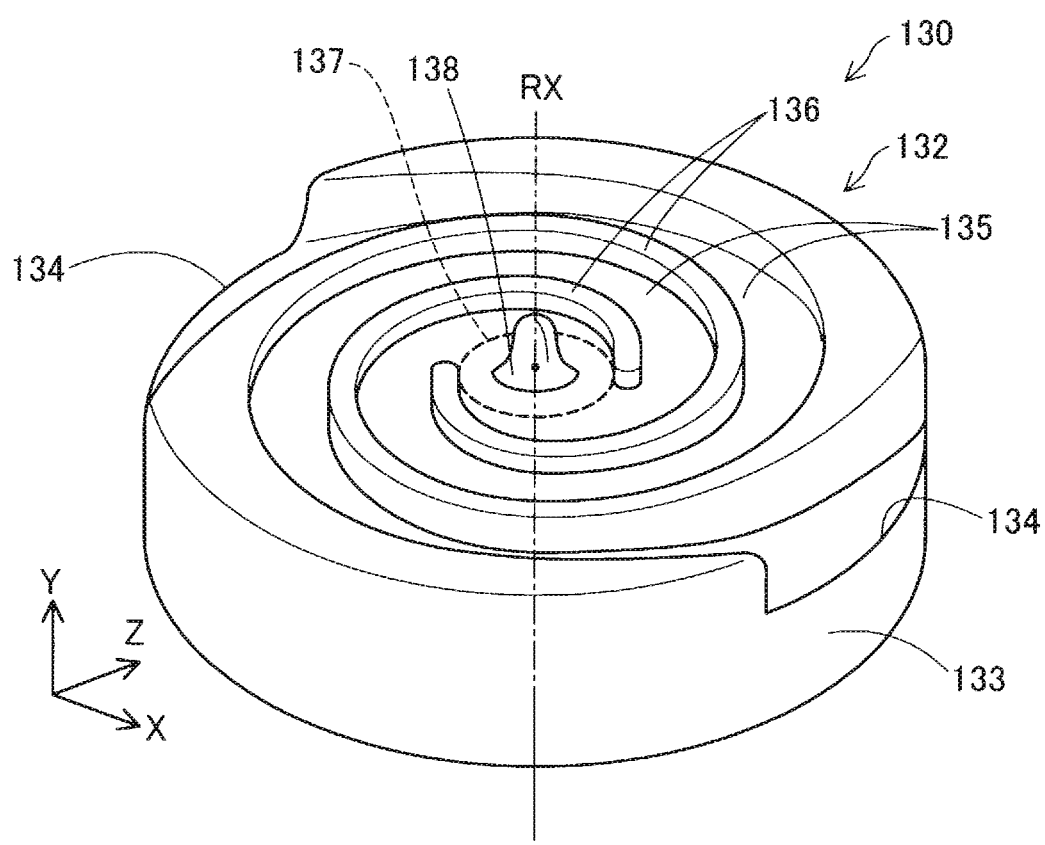
FIG. 3 is a perspective view showing a configuration of a rotor on a groove-forming surface side.

FIG. 3 is a perspective view showing a configuration of the rotor 130 on a groove-forming surface 132 side. In FIG. 3, a position of the central axis RX of the rotor 130 is shown by a dotted and dashed line. As described above, the projection strip portion 136 is provided on the groove-forming surface 132.

The projection strip portion 136 of the rotor 130 is formed from a peripheral edge of a circular central portion 137 of the rotor 130 toward an outer periphery of the rotor 130. In FIG. 3, the central portion 137 is indicated by a broken line. Grooves 135 extending along the projection strip portions 136 are formed on the groove-forming surface 132. The groove 135 is a portion on the groove-forming surface 132 that is recessed in a direction away from the barrel 140 from the projection strip portion 136, and the projection strip portion 136 constitutes a side wall portion of the groove 135. The groove 135 forms a part of a space between the projection strip portion 136 and the barrel 140.

The groove 135 of the rotor 130 constitutes a so-called scroll groove. The groove 135 extends from the central portion 137 toward the outer periphery of the rotor 130 in a swirl shape so as to draw an arc. The groove 135 may be configured to extend in an involute curve shape or a spiral shape. The groove 135 is continuous to a material introduction port 134 formed on a side surface 133 of the rotor 130. The material introduction port 134 is a portion for receiving the material in the groove 135. The material supplied from the material supply unit 110 is supplied between the rotor 130 and the barrel 140 via the material introduction port 134.

One end of the groove 135 is coupled to the central portion 137. Similar to the groove 135, the central portion 137 is configured as a portion of the groove-forming surface 132 that is recessed in the direction away from the barrel 140 from the projection strip portion 136. The central portion 137 intersects the central axis RX. As shown in FIG. 2, the central portion 137 faces a communication hole 146 provided on the facing surface 142 of the barrel 140.

The rotor 130 of the present embodiment includes a protrusion 138 protruding toward the communication hole 146 from the central portion 137. In the present embodiment, a shape of a cross section of the protrusion 138 along the groove-forming surface 132 is circular. A central axis of the protrusion 138 coincides with the central axis RX of the rotor 130. The protrusion 138 has a function of preventing retention of the material in the central portion 137. Details of the protrusion 138 will be described below. A direction in which the protrusion 138 protrudes may be referred to as a protrusion direction. In addition, the retention of the material in the central portion 137 may be called "stagnation".

FIG. 3 shows an example of the rotor 130 including two grooves 135 and two projection strip portions 136. The number of the grooves 135 or the projection strip portions 136 provided in the rotor 130 is not limited to two. The rotor 130 may be provided with only one groove 135, or may be provided with two or more grooves 135. Any number of the projection strip portions 136 may be provided in accordance with the number of the grooves 135.

FIG. 3 illustrates an example of the rotor 130 in which material introduction ports 134 are formed at two places. The number of the material introduction ports 134 provided in the rotor 130 is not limited to two. In the rotor 130, the material introduction port 134 may be provided at only one place, or may be provided at two or more places.

FIG. 4 is an explanatory diagram showing a configuration of the barrel 140 on a facing surface 142 side. As described above, the barrel 140 includes the facing surface 142 facing the groove-forming surface 132 of the rotor 130. The communication hole 146 communicating with the injection nozzle 156 shown in FIG. 2 is provided at a center of the facing surface 142. A plurality of guide grooves 144 are provided around the communication hole 146 on the facing surface 142. The guide groove 144 is coupled to the communication hole 146 at one end thereof, and extends in a swirl shape from the communication hole 146. The guide grooves 144 have a function of guiding the plasticized material to the communication hole 146. It is preferable that the barrel 140 is provided with the guide grooves 144 in order to guide the plasticized material efficiently to the communication hole 146, but the guide grooves 144 may not be provided.

The heating unit 148 heats the material supplied between the rotor 130 and the barrel 140. In the present embodiment, the heating unit 148 is configured by four heaters provided in the barrel 140. Output of the heating unit 148 is controlled by the control unit 500. In the present embodiment, when the material supplied between the rotor 130 and the barrel 140 is heated by the heating unit 148, the barrel 140 or the rotor 130 is also heated by the heating unit 148.

As shown in FIG. 2, the check valve 149 is provided in the communication hole 146. The check valve 149 prevents the plasticized material from flowing from the communication hole 146 back to the central portion 137 or the grooves 135 of the rotor 130.

The plasticization device 120 generates the plasticized material by heating the material by the heating unit 148 while transporting the material toward the communication hole 146 by the rotor 130 and the barrel 140, and the plasticized material flows out from the communication hole 146 to the injection control unit 150.

As shown in FIG. 2, the injection control unit 150 includes a cylinder 151, a plunger 152, and a plunger drive unit 153. The cylinder 151 is a substantially cylindrical member coupled to the communication hole 146 of the barrel 140. The plunger 152 moves inside the cylinder 151. The plunger 152 is driven by the plunger drive unit 153 configured by a motor, a gear, or the like. The plunger drive unit 153 is controlled by the control unit 500.

The injection control unit 150 executes a metering operation and an injecting operation by the plunger 152 sliding in the cylinder 151 under the control of the control unit 500. The metering operation refers to an operation of guiding the plasticized material in the communication hole 146 into the cylinder 151 and metering the material in the cylinder 151 by moving the plunger 152 in a +X direction away from the communication hole 146. The injecting operation refers to an operation of injecting the plasticized material in the cylinder 151 into a molding mold via the injection nozzle 156 by moving the plunger 152 in a −X direction approaching the communication hole 146.

As described above, the injection nozzle 156 is in communication with the communication hole 146. When the above metering operation and injecting operation are executed, the plasticized material metered in the cylinder 151 is sent from the injection control unit 150 to the injection nozzle 156 via the communication hole 146, and is injected from the injection nozzle 156 to the mold unit 160.

The mold unit 160 includes a molding mold 161. The plasticized material sent to the injection nozzle 156 is injected from the injection nozzle 156 into a cavity Cv of the molding mold 161. Specifically, the molding mold 161 includes a movable mold 162 and a fixed mold 163 that face each other, and the cavity Cv is formed between the movable mold 162 and the fixed mold 163. The cavity Cv is a space corresponding to a shape of the molded object. In the present embodiment, the movable mold 162 and the fixed mold 163 are made of a metal material. The movable mold 162 and the fixed mold 163 may be formed of a ceramic material or a resin material.

The mold clamping device 170 includes a mold drive unit 171 and a ball screw unit 172. The mold drive unit 171 is configured by a motor, a gear, or the like, and is coupled to the movable mold 162 via the ball screw unit 172. Driving of the mold drive unit 171 is controlled by the control unit 500. The ball screw unit 172 transmits power generated by the driving of the mold drive unit 171 to the movable mold 162. Under the control of the control unit 500, the mold clamping device 170 moves the movable mold 162 using the mold drive unit 171 and the ball screw unit 172 so as to open and close the mold unit 160.

Figure 5:
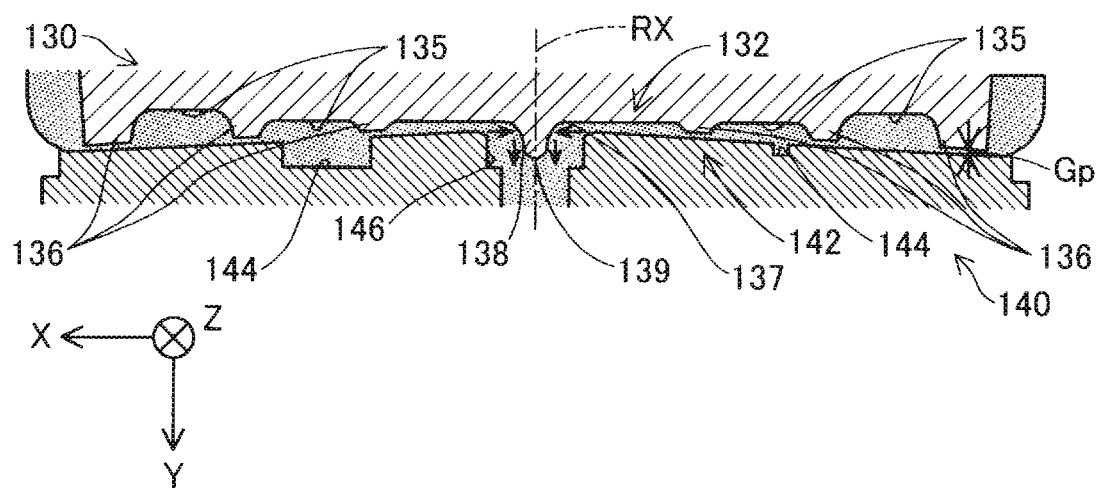
FIG. 5 is a diagram showing a cross section of the rotor and the barrel.

FIG. 5 is a diagram showing a cross section of the rotor 130 and the barrel 140. In FIG. 5, a flow of the material in the central portion 137 when the material is plasticized by the plasticization device 120 is indicated by arrows. As shown in FIG. 5, when the material moved in the direction along the groove-forming surface 132 moves from the central portion 137 to the communication hole 146, the material flows downstream in the communication hole 146 by changing a moving direction toward the direction along the communication hole 146. When the material cannot smoothly change the direction at the central portion 137, for example, the material that reaches the central portion 137 from the outer periphery of the rotor 130 may stay in the vicinity of the central portion 137, or the material may move in a direction from the central portion 137 toward the outer periphery of the rotor 130 again. As described above, in general, the retention of the material easily occurs in the central portion 137.

The material retained in the central portion 137 may remain in the central portion 137 and be mixed with the succeeding material little by little when the subsequent material is plasticized in the plasticization device 120. For example, in the present embodiment, when injection molding is performed using one material and then the injection molding is performed using another material, there is a possibility that the one material may be mixed with the other material at the central portion 137 when the other material is plasticized. As a result, a plasticized material in which the one material and the other material are mixed may be injected from the injection nozzle 156. In particular, when colors of the one material and the other material are different, there is a possibility that the colors of the plasticized materials are mixed at the central portion 137 and the plasticized materials having the mixed color are injected from the injection nozzle 156.

By providing the rotor 130 with the above protrusion 138, the flow of the material from the central portion 137 to the communication hole 146 is promoted. Here, when the protrusion 138 is too small, an effect of promoting the flow of the material from the central portion 137 to the communication hole 146 may not be sufficiently obtained. On the other hand, when the protrusion 138 is too large, the protrusion 138 may obstruct the flow of material in the central portion 137.

Figure 6:
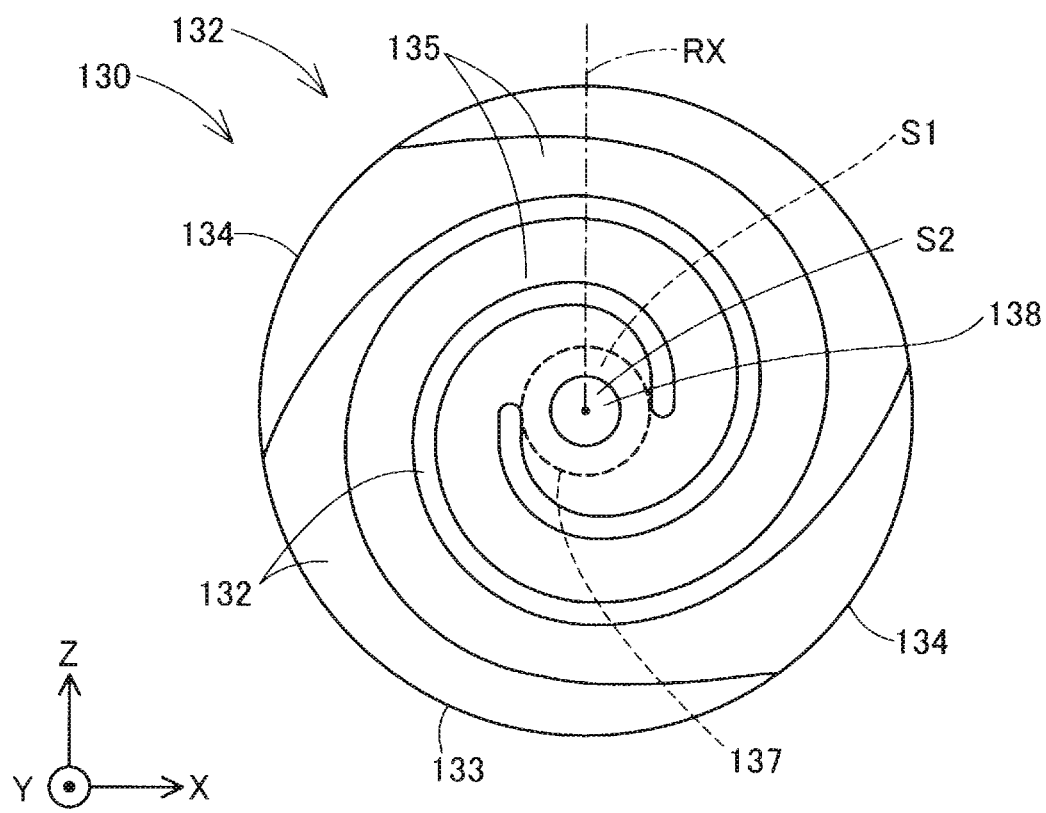
FIG. 6 is a diagram showing a groove-forming surface of the rotor.

FIG. 6 is a diagram showing the groove-forming surface 132 of the rotor 130. In FIG. 6, the central portion 137 of the rotor 130 is indicated by a broken line. Further, FIG. 6 shows an area S1 of the central portion 137 as seen from the protruding direction and a maximum area S2 of the cross section of the protrusion 138 along the groove-forming surface 132. The area S1 and the area S2 satisfy the following expression (1).

$$0.28 \leq S2/S1 \leq 1.03 \tag{1}$$

By satisfying the above expression (1), the flow of the material in the central portion 137 is not obstructed by the protrusion 138, and the flow of the material from the central portion 137 to the communication hole 146 is promoted by the protrusion 138.

Further, it is preferable that the area S2 and the area S1 satisfy the following expression (2).

$$0.43 \leq S2/S1 \leq 0.92 \tag{2}$$

By satisfying the expression (2), the flow of the material in the central portion 137 is not obstructed by the protrusion 138, and the flow of the material from the central portion 137 to the communication hole 146 is further promoted by the protrusion 138.

As shown in FIG. 5, in the present embodiment, a tip 139 in the protrusion direction of the protrusion 138 provided on the rotor 130 is located inside the communication hole of the barrel 140. As a result, the material at the central portion 137 is easily guided to the communication hole 146 by the protrusion 138.

Further, in the present embodiment, the groove-forming surface 132 of the rotor 130 is arranged with a gap Gp interposed between the groove-forming surface 132 and the barrel 140. Therefore, in the present embodiment, the contact between the rotor 130 and the barrel 140 when the material is plasticized is prevented. A size of the gap Gp may be set as an optional value, and is preferably 0.5 mm to 2 mm, for example. The size of the gap Gp is a shortest distance between the groove-forming surface 132 and the facing surface 142 of the barrel 140, and in the present embodiment, the size is a distance between the projection strip portion 136 provided on the outermost periphery of the groove-forming surface 132 and the barrel 140.

Figure 7:
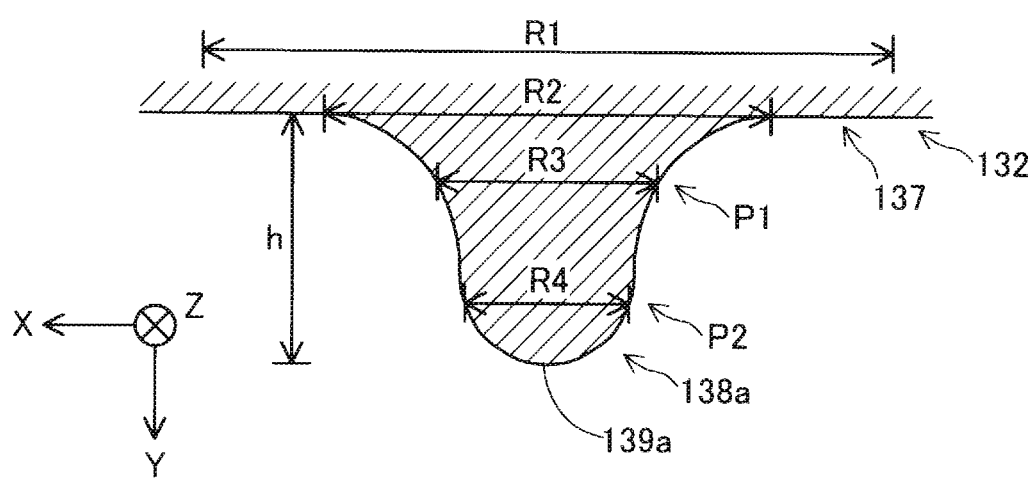
FIG. 7 is a cross-sectional view showing a protrusion as an example of the first embodiment.

FIG. 7 is a cross-sectional view showing a protrusion 138a as an example of the present embodiment. The cross section of the protrusion 138a along the groove-forming surface 132 is circular. In the protrusion 138, an area ratio S2/S1 is 0.29. A height h of the protrusion 138a along a +Y direction from the central portion 137 is 4 mm. In the present embodiment, since a distance from the central portion 137 to an end of the communication hole 146 in a −Y direction is 1.2 mm, a tip 139a of the protrusion 138a is located inside the communication hole of the barrel 140. In an example shown in FIG. 7, the area S1 of the central portion 137 can be obtained based on a diameter R1 of the central portion 137, and the area S2 of the protrusion 138a can be obtained based on a diameter R2.

In the example shown in FIG. 7, similarly to the area S1 and the area S2, an area S3 at a first position P1 and an area S4 at a second position P2 of the protrusion 138a can be obtained based on a diameter R3 of the first position P1 and a diameter R4 of the second position P2. The first position P1 and the second position P2 are positions in the protrusion direction. The second position P2 refers to a position closer to the communication hole 146 than the first position P1 in the protrusion direction. The area S3 and the area S4 are areas of the cross section of the protrusion 138a along the groove-forming surface 132, similarly to the area S2. In the example shown in FIG. 7, the diameter R4 of the second position P2 is equal to or less than the diameter R3 of the first position P1. Therefore, the area S4 of the second position P2 is equal to or less than the area S3 of the first position P1.

As in the example shown in FIG. 7, the area S4 of the second position P2 is preferably equal to or less than the area S3 of the first position P1. In this case, the flow of the material from the central portion 137 to the communication hole 146 is less likely to be obstructed by the protrusion 138a at the second position. Further, as in the example shown in FIG. 7, the protrusion 138a preferably has a tapered shape in which the area of the cross section along the groove-forming surface decreases toward the protrusion direction. In this case, the material of the central portion 137 moves along the shape of the protrusion 138a, so that the material easily flows into the communication hole 146.

In another embodiment, the area S4 of the second position P2 may be larger than the area S3 of the first position P1, and in this case, the protrusion 138 has a neck shape. That is, the protrusion 138 of the present embodiment has a shape that does not include a constriction. The "constriction" may be called a "scooped hollow".

Figure 8:
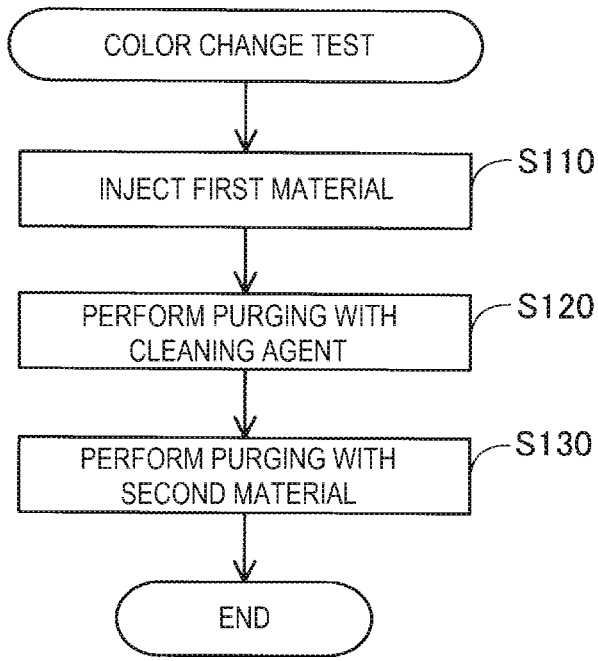
FIG. 8 is a process chart showing a procedure of a color change test.

FIG. 8 is a process chart showing a procedure of a color change test. In order to verify the effect of the protrusion 138a, the color change test shown in FIG. 8 is performed using the injection molding apparatus 100 including the plasticization device 120 provided with the protrusion 138a on the rotor 130. Further, the color change test shown in FIG. 8 is also performed in the injection molding apparatus 100 including the plasticization device 120 in which the rotor 130 is not provided with the protrusion 138. In the color change test, color change time required to change the material to be injected from a first material to a second material having a color different from that of the first material is measured. Details of the color change test will be described below.

In step S110, the first material is injected. Specifically, first, the first material is charged into the material supply unit 110. Thereafter, by controlling the injection unit 105, the charged first material is plasticized by the plasticization device 120, and the plasticized first material is injected from the injection nozzle 156. As the first material, a black ABS resin formed in the pellet shape is used. In the color change test, a rotation speed of the rotor 130 is controlled to 36 rpm, and a temperature of the heating unit 148 is controlled to 230° C. Further, the plasticized material or a cleaning agent to be described later are not injected into the molding mold 161 but are injected to the outside.

In step S120, purging is performed with the cleaning agent. Specifically, first, the cleaning agent is charged into the material supply unit 110. Thereafter, by controlling the injection unit 105, the charged cleaning agent is plasticized by the plasticization device 120, and the plasticized cleaning agent is injected from the injection nozzle 156. In step S120, the purging with the cleaning agent is performed until the first material is no longer mixed in the injected cleaning agent. Asahi Kasei Corporation's ASACLEAN U is used as the cleaning agent.

In step S130, the purging is performed with the second material. Specifically, first, the second material is charged into the material supply unit 110. Thereafter, by controlling the injection unit 105, the charged second material is plasticized by the plasticization device 120, and the plasticized second material is injected from the injection nozzle 156. In step S130, the purging with the second material is performed until the cleaning agent is no longer mixed in the injected second material. As the second material, a white ABS resin formed in the pellet shape is used.

Time from a start of an execution of step S120 to a completion of step S130 is measured as time required for color change. In the injection molding apparatus 100 including the plasticization device 120 provided with the protrusion 138a on the rotor 130 shown in FIG. 7, the color change time is 15 minutes. On the other hand, in the injection molding apparatus 100 including the plasticization device 120 in which the rotor 130 is not provided with the protrusion 138, in step S120, the purging with the cleaning agent is not completed even after 2 hours is passed, and the color change test is not completed. That is, the color change time is unmeasurable.

From results of the color change test described above, it is inferred that in the plasticization device 120 in which the rotor 130 is provided with the protrusion 138a, the retention of the material in the central portion 137 is prevented.

In actual injection molding, when the material used in the middle is changed, a cleaning agent different from the above ASACLEAN U may be used as the cleaning agent. For example, a general cleaning agent or the like in which an additive is mixed with a polyolefin resin may be used. In addition, a type or grade of the cleaning agent may be selected according to a type of the material to be used, a plasticizing condition, or the like. Further, when the material can be changed without using the cleaning agent, the material may be changed without using the cleaning agent. For example, when it is possible to purge a resin before a material change by injecting a resin after the material change, it is not necessary to use the cleaning agent.

Figure 9:
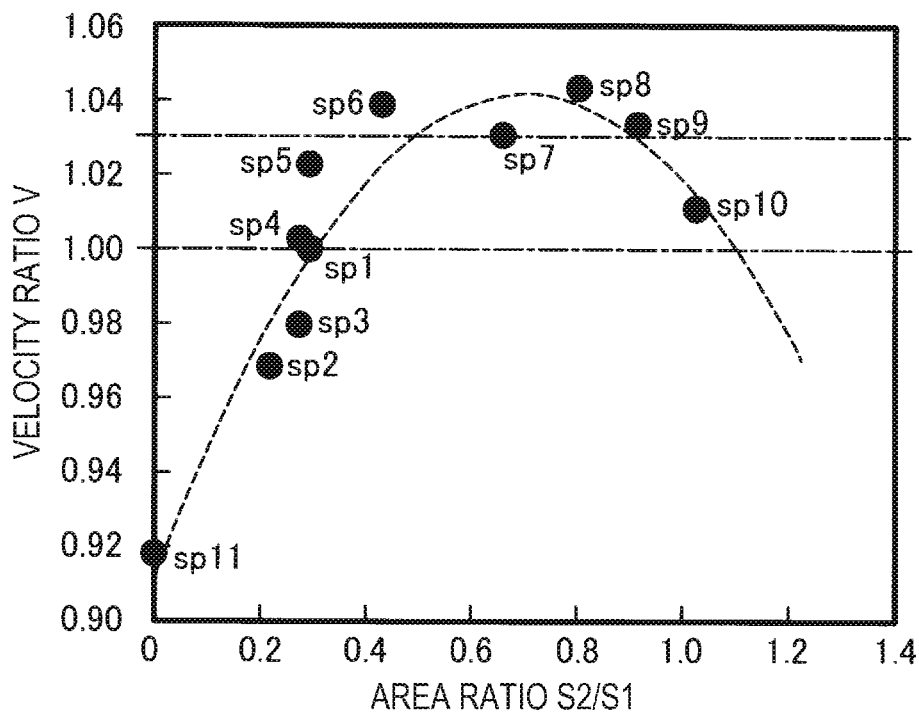
FIG. 9 is a graph in which a velocity ratio of a plasticized material is set as a vertical axis and an area ratio is set as a horizontal axis.
Figure 10:
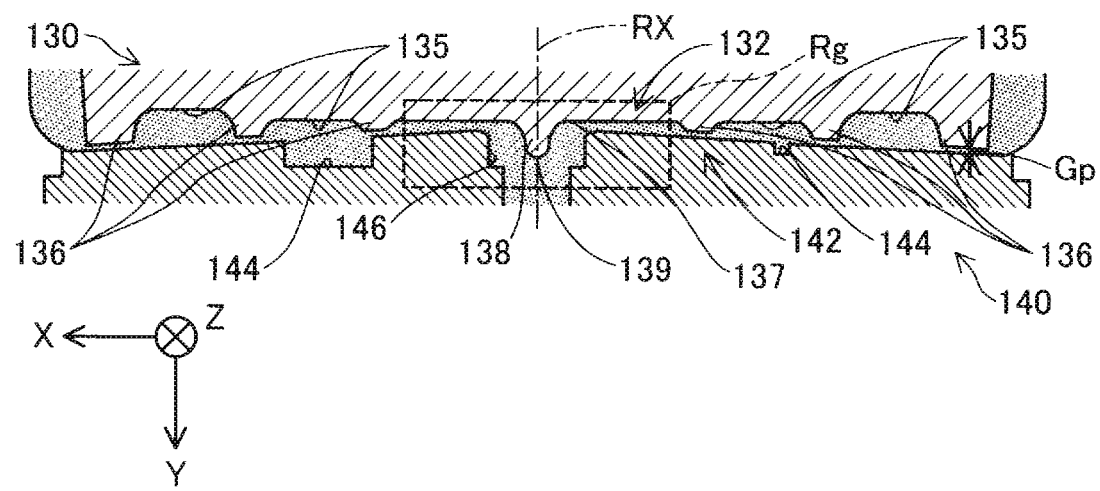
FIG. 10 is a diagram illustrating an outline of a simulation.

FIG. 9 is a graph in which a velocity ratio V of the plasticized material is set as a vertical axis and the area ratio S2/S1 is set as a horizontal axis. FIG. 10 is a diagram illustrating an outline of a simulation performed by CAE software. The graph of FIG. 9 is obtained from a result of simulating the flow of material in the plasticization device 120 using the CAE software. In this simulation, as shown in FIG. 10, it is assumed that the material between the rotor 130 and the barrel 140 is moved toward the communication hole 146 by rotating the rotor 130. In this state, an average velocity Va in a radial direction of the rotor 130 of the material flowing through a region Rg including the central portion 137 and a part of the communication hole 146 is calculated by the CAE software. In this simulation, an effect of the change in the area ratio S2/S1 is verified by keeping the area S1 of the central portion 137 constant and changing the area S2 of the protrusion 138.

FIG. 10 shows a cross section of the rotor 130 and the barrel 140 cut along an XY plane passing through a center of the rotor 130. The XY plane refers to a plane along the X direction and the Y direction. The above region Rg is a rectangular region extending in the X direction and the Y direction in the cross section shown in FIG. 10. A side of the region Rg along the X direction is bisected by the central axis RX of the rotor 130. A length of the side of the region Rg along the X direction is 15 mm. A distance from the central portion 137 to a bottom surface of the region Rg in the +Y direction is 6.1 mm. Further, in the above simulation, the rotation speed of the rotor 130 is set to 36 rpm. The ABS resin is set as the material, and the temperature of the material is set to 230° C. In the present embodiment, the radius of the rotor 130 is 60 mm, and the radius of the central portion 137 is 7.35 mm.

Figure 11:
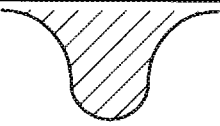
FIG. 11 is a diagram showing shapes of the protrusion used in the simulation.
Figure 11:
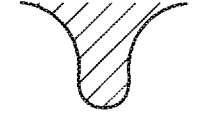
Figure 11:
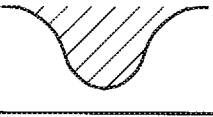
Figure 11:
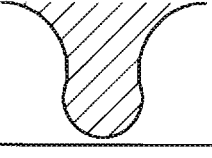
Figure 11:
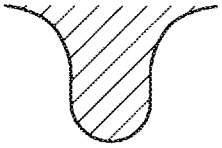
Figure 11:
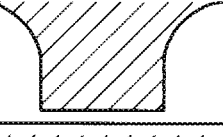
Figure 11:
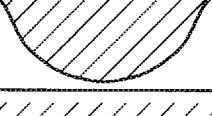
Figure 11:
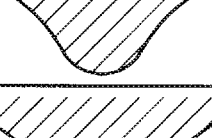
Figure 11:
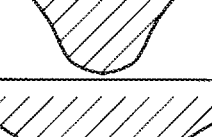
Figure 11:
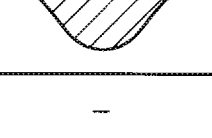

FIG. 11 is a diagram showing shapes of the protrusion 138 used in the simulation. In FIG. 11, samples sp1 to sp11 are shown as the shapes of the protrusion 138. Further, FIG. 11 shows the area ratio S2/S1, the height h, and a presence or an absence of the constriction in each sample.

Cross-sectional shapes of the samples sp1 to sp11 are circular, respectively. Further, the sample sp1 corresponds to the shape of the protrusion 138a described above. The sample sp11 corresponds to a case where the rotor 130 is not provided with the protrusion 138.

The velocity ratio V in the graph of FIG. 9 represents a ratio of an average velocity Va in the simulation for each sample to an average velocity Va in the simulation for the sample sp1. In this simulation, since the material is moved from the outer periphery to the center of the rotor 130, an absolute value of the average velocity Va increases as the flow of the material from the outer periphery to the center of the rotor 130 increases. Therefore, the absolute value of the average velocity Va is larger when the material does not retain in the vicinity of the central portion 137 than when the material retains. Therefore, actually as long as the protrusion 138 has a shape similar to a certain sample when the velocity ratio V for the sample is 1.0 or more, it is expected that the retention of the material in the central portion 137 can be prevented since the protrusion 138 has the shape similar to the sample sp1. In FIG. 9, an approximate curve obtained by the least squares method is shown by a broken line. As shown in FIG. 9, the velocity ratio V and the area ratio S2/S1 have a certain relationship.

With reference to FIG. 9, the velocity ratio V in the sample sp11 is less than 1. In the samples sp1 and sp4 to sp10 in which the area ratio S2/S1 satisfies the above expression (1), the velocity ratio V is 1 or more. In the samples sp6 to sp9 in which the area ratio S2/S1 satisfies the above expression (2), the velocity ratio V is 1.03 or more. Further, the velocity ratio V in the samples sp2 and sp3 in which the area ratio S2/S1 does not satisfy the above expression (1) is larger than the velocity ratio V in the sample sp11, but is a value less than 1.

From the above simulation results, it is found that when the area ratio S2/S1 satisfies the relationship of the above expression (1), the retention of the material in the central portion 137 is prevented. Further, it is found that when the area ratio S2/S1 satisfies the relationship of the above expression (2), the retention of the material in the central portion 137 is prevented more effectively.

According to the plasticization device of the present embodiment described above, the relationship between the area S1 of the central portion 137 and the maximum area S2 of the cross section of the protrusion 138 along the groove-forming surface 132 satisfies the above expression (1). Therefore, the flow of the material in the central portion 137 is not obstructed by the protrusion 138, and the flow of the material from the central portion 137 to the communication hole 146 is promoted by the protrusion 138. Therefore, the retention of the material in the central portion 137 is prevented.

Further, in the present embodiment, the tip 139 of the protrusion 138 is located inside the communication hole 146. As a result, the material of the central portion 137 is easily guided to the communication hole 146 by the protrusion 138. Therefore, the retention of the material in the central portion 137 is prevented more effectively.

Further, in the present embodiment, the groove-forming surface 132 is arranged with the gap Gp interposed between the groove-forming surface 132 and the barrel 140. Accordingly, the contact between the rotor 130 and the barrel 140 when the material is plasticized is prevented. Therefore, damage such as wear or loss of the rotor 130 and the barrel 140 is prevented.

Further, it is preferable that the relationship between the area S1 and the area S2 satisfies the above expression (2). Therefore, the flow of the material in the central portion 137 is not further obstructed by the protrusion 138, and the flow of the material from the central portion 137 to the communication hole 146 is further promoted by the protrusion 138. Therefore, the retention of the material in the central portion 137 is prevented more effectively.

Further, the area S4 along the groove-forming surface 132 of the second position P2 of the protrusion 138 is preferably equal to or less than the area S3 along the groove-forming surface 132 of the first position P1. Accordingly, the flow of the material from the central portion 137 to the communication hole 146 is less likely to be obstructed by the protrusion 138 at the second position P2. Therefore, the retention of the material in the central portion 137 is prevented more effectively.

Further, the protrusion 138 preferably has the tapered shape in which the area along the groove-forming surface 132 decreases toward the protrusion direction. Accordingly, the material of the central portion 137 easily flows into the communication hole 146 by moving along the shape of the protrusion 138. Therefore, the retention of the material in the central portion 137 is prevented more effectively.

B. Second Embodiment

Figure 12:
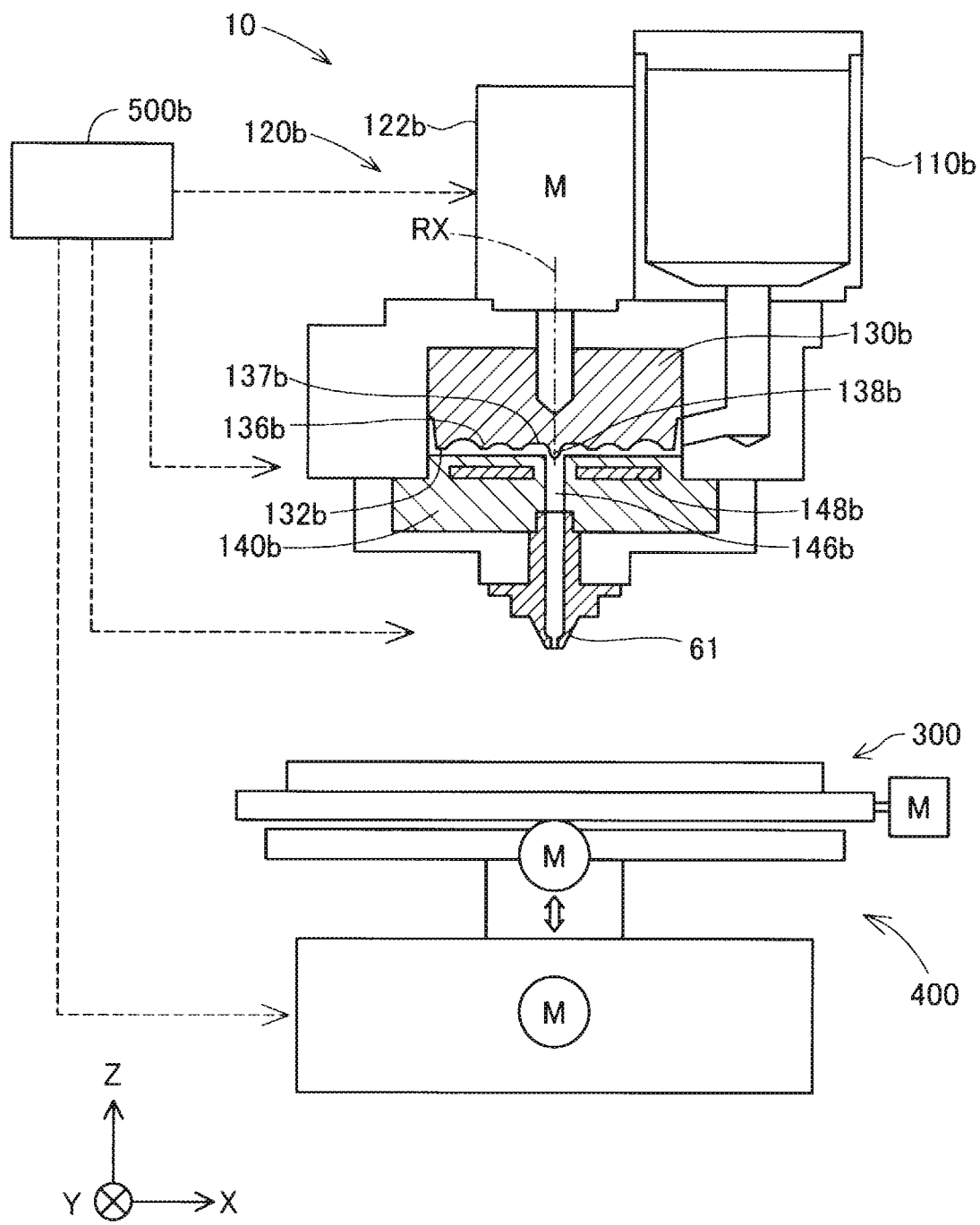
FIG. 12 is an explanatory diagram showing a schematic configuration of a three-dimensional modeling apparatus as a second embodiment.

FIG. 12 is an explanatory diagram showing a schematic configuration of a three-dimensional modeling apparatus 10 as a second embodiment. The three-dimensional modeling apparatus 10 includes a discharge nozzle 61, a material supply unit 110b, a plasticization device 120b, a stage 300, a moving mechanism 400, and a control unit 500b. The three-dimensional modeling apparatus 10 of the present embodiment plasticizes the material supplied from the material supply unit 110b by the plasticization device 120b, and discharges the plasticized material from the discharge nozzle 61 toward the stage 300.

The moving mechanism 400 is configured such that relative positions of the discharge nozzle 61 and the stage 300 can be changed. In the present embodiment, the moving mechanism. 400 moves the stage 300 without moving the discharge nozzle 61. The moving mechanism 400 is configured by a three-axis positioner that moves the stage 300 in three-axis directions of the X, Y, and Z directions by driving forces of three motors. The moving mechanism 400 is controlled by the control unit 500. In another embodiment, the relative positions of the discharge nozzle 61 and the stage 300 may be changed by moving the discharge nozzle 61 without moving the stage 300. Further, the moving mechanism 400 may move both the discharge nozzle 61 and the stage 300.

Similar to the first embodiment, the plasticization device 120b includes a drive motor 122b, a rotor 130b rotated by the drive motor 122b, a barrel 140b, and a heating unit 148b. On a groove-forming surface 132b of the rotor 130b, projection strip portions 136b are formed from a peripheral edge of a central portion 137b toward an outer periphery of the rotor 130b. A communication hole 146b that is in communication with the discharge nozzle 61 is provided at a position of the barrel 140b facing the central portion 137b of the rotor 130b. The heating unit 148b heats the material supplied between the rotor 130b and the barrel 140b. The plasticization device 120b generates the plasticized material by heating the material by the heating unit 148b while transporting the material toward the communication hole 146b by the rotor 130b and the barrel 140b, and the plasticized material flows out from the communication hole 146b to the discharge nozzle 61.

The control unit 500b controls the moving mechanism 400 and the plasticization device 120b according to modeling data acquired in advance, and thus a three-dimensional modeling object is modeled by discharging the plasticized material from the discharge nozzle 61 to an optional position on the stage 300.

Similarly to the first embodiment, the rotor 130b of the present embodiment includes a protrusion 138b protruding from the central portion 137b toward the communication hole 146b. Further, for the rotor 130b of the present embodiment, the area ratio S2/S1 satisfies the expression (1) as in the first embodiment.

According to the three-dimensional modeling apparatus 10 of the second embodiment described above, the relationship between the area S1 of the central portion 137b and the maximum area S2 of the cross section of the protrusion 138b along the groove-forming surface 132b satisfies the above expression (1). Therefore, the flow of the material in the central portion 137b is not obstructed by the protrusion 138b, and the flow of the material from the central portion 137b to the communication hole 146b is promoted by the protrusion 138b. Therefore, the retention of the material in the central portion 137b is prevented.

C. Other Embodiments

C-1. In the above embodiment, the tip 139 of the protrusion 138 is located inside the communication hole 146. On the other hand, the tip 139 of the protrusion 138 may not be located inside the communication hole 146. For example, the tip 139 of the protrusion 138 may be located in the −Y direction of the communication hole 146 without reaching the communication hole 146. Further, the tip 139 of the protrusion 138 may be located in the +Y direction of the communication hole 146.

C-2. In the above embodiment, the groove-forming surface 132 of the rotor 130 is arranged with the gap Gp interposed between the groove-forming surface 132 and the barrel 140. On the other hand, the groove-forming surface 132 may be provided in contact with the barrel 140 without the gap Gp interposed between the groove-forming surface 132 and the barrel 140.

C-3. In the above embodiment, the shape of the cross section of the protrusion 138 along the groove-forming surface 132 is circular. On the other hand, the cross section of the protrusion 138 may have another shape instead of the circular shape. For example, the cross section may have an elliptical shape, a triangular shape, a quadrangular shape, or another polygonal shape.

C-4. In the above embodiment, the central axis of the protrusion 138 coincides with the central axis RX of the rotor 130. On the other hand, the central axis of the protrusion 138 may not coincide with the central axis RX of the rotor 130. For example, the position of the central axis of the protrusion 138 may be a position different from the central axis RX of the rotor 130. Further, the central axis of the protrusion 138 may be inclined with respect to the central axis RX of the rotor 130.

D. Other Aspects

The present disclosure is not limited to the embodiments described above, and can be implemented in various forms without departing from the scope of the present disclosure. For example, the present disclosure can be implemented by the following aspects. In order to solve some or all of problems of the present disclosure, or to achieve some or all of effects of the present disclosure, technical characteristics in the above embodiments corresponding to technical characteristics in aspects described below can be replaced or combined as appropriate. In addition, when the technical characteristics are not described as essential in the present description, the technical characteristics can be appropriately deleted.

1. A first aspect of the present disclosure provides a plasticization device that plasticizes a material. The plasticization device includes: a drive motor; a rotor that is to be rotated by the drive motor and has a groove-forming surface in which a curved projection strip portion is formed from a peripheral edge of a circular central portion toward an outer periphery of the rotor; a barrel that faces the groove-forming surface and includes a communication hole at a position facing the central portion of the groove-forming surface; and a heating unit that heats the material supplied between the rotor and the barrel, the rotor includes a protrusion protruding from the central portion toward the communication hole, and $$0.28 \le S2/S1 \le 1.03 \tag{1}$$

wherein S1 is an area of the central portion and S2 is a maximum area of a cross section of the protrusion along the groove-forming surface.

According to such an aspect, the flow of the material in the central portion is not obstructed by the protrusion, and the flow of the material from the central portion to the communication hole is promoted by the protrusion. Therefore, the retention of the material in the central portion is prevented.

2. In the plasticization device according to the above aspect, $$0.43 \le S2/S1 \le 0.92 \tag{2}$$

According to such an aspect, the flow of the material in the central portion is not further obstructed by the protrusion, and the flow of the material from the central portion to the communication hole is further promoted by the protrusion. Therefore, the retention of the material in the central portion is prevented more effectively.

3. In the plasticization device according to the above aspect, a tip of the protrusion may be located inside the communication hole. According to such an aspect, the material of the central portion is easily guided to the communication hole by the protrusion. Therefore, the retention of the material in the central portion is prevented more effectively.

4. In the plasticization device according to the above aspect, the groove-forming surface may be arranged with a gap interposed between the groove-forming surface and the barrel. According to such an aspect, the contact between the rotor and the barrel when the material is plasticized is prevented. Therefore, the damage such as wear or loss of the rotor and the barrel is prevented.

5. In the plasticization device according to the above aspect, the protrusion may include a first position in a protrusion direction in which the protrusion protrudes, and a second position closer to the communication hole than the first position in the protrusion direction, and an area of a cross section of the protrusion along the groove-forming surface at the second position may be equal to or less than an area of a cross section of the protrusion along the groove-forming surface at the first position. According to such an aspect, the flow of the material from the central portion to the communication hole is less likely to be obstructed by the second position of the protrusion. Therefore, the retention of the material in the central portion is prevented more effectively.

6. In the plasticization device according to the above aspect, the protrusion may have a tapered shape in which the area of the cross section along the groove-forming surface decreases toward the protrusion direction. According to such an aspect, the material of the central portion easily flows into the communication hole by moving along the shape of the protrusion. Therefore, the retention of the material in the central portion is prevented more effectively.

7. A second aspect of the present disclosure provides an injection molding apparatus. The injection molding apparatus includes: the plasticization device according to the first aspect; and a nozzle that communicates with the communication hole and injects the plasticized material into a molding mold.

According to such an aspect, the flow of the material in the central portion is not obstructed by the protrusion, and the flow of the material from the central portion to the communication hole is promoted by the protrusion. Therefore, the retention of the material in the central portion is prevented.

8. A third aspect of the present disclosure provides a three-dimensional modeling apparatus. The three-dimensional modeling apparatus includes: the plasticization device according to the first aspect; and a nozzle that communicates with the communication hole and discharges the plasticized material toward a stage.

According to such an aspect, the flow of the material in the central portion is not obstructed by the protrusion, and the flow of the material from the central portion to the communication hole is promoted by the protrusion. Therefore, the retention of the material in the central portion is prevented.

The present disclosure is not limited to the aspects of the plasticization device, the injection molding apparatus or the three-dimensional modeling apparatus described above, and can be implemented in various aspects. For example, the present disclosure can be implemented as an extrusion molding device or various devices including the plasticization device.

What is claimed is:

1. A plasticization device that plasticizes a material, comprising:
a drive motor;
a rotor that is to be rotated by the drive motor and has a groove-forming surface in which a groove and a curved projection strip portion is formed, the curved projection strip portion extends, as a continuous structure, from a peripheral edge of a circular central portion to an outer periphery of the rotor, the curved projection strip portion extends one or more turns around the circular central portion;
a barrel that faces the groove-forming surface and includes a communication hole at a position facing the circular central portion of the groove-forming surface, a guide groove is formed on a facing surface of the barrel that faces the groove-forming surface and extends to the communication hole, the guide groove extends outwardly on an inclined planar facing surface that extends from the communication hole toward a perimeter of the barrel; and
a heating unit configured to heat the material supplied between the rotor and the barrel, wherein
the rotor includes a protrusion protruding from the circular central portion and toward the communication hole, the protrusion comprises a sinusoidal profile with a hemispherical tip, the circular central portion of the groove-forming surface providing a groove portion encircling the protrusion to space a terminal end of the curved projection strip portion from the protrusion, and $$0.28 <= S2/S1 <= 1.03 \tag{1}$$

wherein S1 is an area of the circular central portion and S2 is a maximum area of a cross-section of the protrusion along the groove-forming surface.

2. The plasticization device according to claim 1, wherein $$0.43 \le S2/S1 \le 0.92 \tag{2}$$

3. The plasticization device according to claim 1, wherein a tip of the protrusion is located inside the communication hole.

4. The plasticization device according to claim 1, wherein the groove-forming surface is arranged with a gap interposed between the groove-forming surface and the barrel.

5. The plasticization device according to claim 1, wherein
the protrusion includes a first position in a protrusion direction in which the protrusion protrudes, and a second position closer to the communication hole than the first position in the protrusion direction, and
an area of a cross section of the protrusion along the groove-forming surface at the second position is equal to or less than an area of a cross section of the protrusion along the groove-forming surface at the first position.

6. The plasticization device according to claim 5, wherein the protrusion has a tapered shape in which the area of the cross section along the groove-forming surface decreases toward the protrusion direction.

7. An injection molding apparatus, comprising:
the plasticization device according to claim 1; and
a nozzle that communicates with the communication hole and injects the plasticized material into a molding mold.

8. A three-dimensional modeling apparatus, comprising:
the plasticization device according to claim 1; and
a nozzle that communicates with the communication hole and discharges the plasticized material toward a stage.

9. The plasticization device according to claim 3, wherein the communication hole includes an inlet provided on the facing surface of the barrel and an outlet which is farther from the facing surface of the barrel than the inlet, and the communication hole which is a flow path connected from the inlet to the outlet has a first portion and a second portion, the second portion is closer to the outlet than the first portion, and has an opening smaller than an opening of the first portion, wherein
the tip of the protrusion is located inside the first portion, and is not located inside the second portion.

10. The plasticization device according to claim 1, wherein
the guide groove is directly connected to the communication hole.

11. The plasticization device according to claim 1, wherein
when viewed from a direction perpendicular to a rotation axis of the rotor, the inclined planar facing surface is inclined toward the communicating hole so as to approach the circular central portion.

12. The plasticization device according to claim 1, wherein $$0.29 \leq S2/S1 \leq 1.03 \tag{3},$$

and when expression (3) is satisfied, a velocity ratio V is greater than 1, where V is a ratio of an average velocity of the material in a radial direction of the rotor within a region including the circular central portion and an average velocity of the material in a radial direction of a protrusion-less rotor.

13. The plasticization device according to claim 4, wherein the groove-forming surface is arranged with the gap is set between 0.5 mm to 2 mm.

14. The plasticization device according to claim 1, wherein
a central axis of the protrusion coincides with a rotation axis of the rotor.

* * * * *